United States Patent
Louzoun et al.

(10) Patent No.: US 9,577,791 B2
(45) Date of Patent: Feb. 21, 2017

(54) NOTIFICATION BY NETWORK ELEMENT OF PACKET DROPS

(71) Applicant: Intel Corporation, Santa Clara, CA (US)

(72) Inventors: Eliel Louzoun, Jerusalem (IL); Radia Perlman, Redmond, WA (US); Ben-Zion Friedman, Jerusalem (IL); Ygdal Naouri, Jerusalem (IL); Eliezer Tamir, Bait Shemesh (IL)

(73) Assignee: Intel Corporation, Santa Clara, CA (US)

( * ) Notice: Subject to any disclaimer, the term of this patent is extended or adjusted under 35 U.S.C. 154(b) by 980 days.

(21) Appl. No.: 13/705,491

(22) Filed: Dec. 5, 2012

(65) Prior Publication Data
US 2014/0153574 A1     Jun. 5, 2014

(51) Int. Cl.
*H04L 12/28*     (2006.01)
*H04L 1/16*      (2006.01)
(Continued)

(52) U.S. Cl.
CPC ............ *H04L 1/1657* (2013.01); *H04L 1/188* (2013.01); *H04L 2001/0092* (2013.01)

(58) Field of Classification Search
CPC ......... H04L 45/74; H04L 45/07; H04L 69/22; H04L 45/38
(Continued)

(56) References Cited

U.S. PATENT DOCUMENTS 5,889,775 A * 3/1999 Sawicz ............... H04Q 3/68
                                                      340/2.22
6,084,856 A   7/2000 Simmons et al.
(Continued)

FOREIGN PATENT DOCUMENTS

CN     1640076 A    7/2005
CN   101632269 A    1/2010
(Continued)

OTHER PUBLICATIONS

Office Action received for Korean Patent Application No. 10-2014-0071742, mailed on May 15, 2015, 3 pages of Korean Office Action only.
(Continued)

*Primary Examiner* — Chi H Pham
*Assistant Examiner* — Alexander O Boakye
(74) *Attorney, Agent, or Firm* — Law Office of R. Alan Burnett, PS

(57) ABSTRACT

Methods and apparatus for implementing notification by network elements of packet drops. In response to determining a packet is to be dropped, a network element such as a switch or router determines the source of the packet and returns a dropped packet notification message to the source. Upon receipt of notification, networking software or embedded hardware on the source causes the dropped packet to be retransmitted. The notification may also be sent from the network element to the destination computer to inform networking software or embedded logic implemented by the destination computer that the packet was dropped and notification to the source has been sent, thus alleviating the destination from needing to send a Selective ACKnowledge (SACK) message to inform the source the packet was not delivered. (Too narrow)

24 Claims, 8 Drawing Sheets

(51) Int. Cl.
*H04L 1/18* (2006.01)
*H04L 1/00* (2006.01)

(58) Field of Classification Search
USPC ....... 370/392, 232, 233, 474, 229, 235, 236, 370/230.1, 231; 709/232, 233, 234, 235
See application file for complete search history.

(56) References Cited

U.S. PATENT DOCUMENTS

| | | | |
|---|---|---|---|
| 6,496,516 | B1 | 12/2002 | Dabecki et al. |
| 6,754,179 | B1 | 6/2004 | Lin |
| 6,775,280 | B1 | 8/2004 | Ma et al. |
| 7,672,243 | B2 | 3/2010 | Mayhew |
| 7,801,165 | B2 | 9/2010 | Aaltonen |
| 8,077,606 | B1 * | 12/2011 | Litwack ............. H04L 43/0882 370/229 |
| 8,144,708 | B1 | 3/2012 | Ahmed et al. |
| 8,635,284 | B1 | 1/2014 | Tripathi et al. |
| 8,989,017 | B2 | 3/2015 | Naouri et al. |
| 9,030,936 | B2 | 5/2015 | Friedman et al. |
| 2003/0002503 | A1 | 1/2003 | Brewer et al. |
| 2003/0233594 | A1 * | 12/2003 | Earl .................. G06F 11/0709 714/4.11 |
| 2005/0270976 | A1 | 12/2005 | Yang et al. |
| 2007/0104096 | A1 | 5/2007 | Ribera |
| 2007/0140114 | A1 | 6/2007 | Mosko |
| 2007/0140240 | A1 | 6/2007 | Dally et al. |
| 2007/0206497 | A1 * | 9/2007 | Plamondon ........... H04L 1/1887 370/231 |
| 2010/0177637 | A1 | 7/2010 | Kadambi et al. |
| 2012/0224475 | A1 | 9/2012 | Taylor et al. |
| 2012/0297083 | A1 | 11/2012 | Ferguson et al. |

FOREIGN PATENT DOCUMENTS

| | | |
|---|---|---|
| KR | 10-2004-0009225 A | 1/2004 |
| KR | 10-2009-0076811 A | 7/2009 |
| KR | 10-2009-0128405 A | 12/2009 |
| KR | 10-0941562 B1 | 2/2010 |
| WO | 2011/093836 A1 | 8/2011 |
| WO | 2014/092779 A1 | 6/2014 |
| WO | 2014/092780 A1 | 6/2014 |

OTHER PUBLICATIONS

International Preliminary Report on Patentability and Written Opinion Received for PCT Patent Application No. PCT/US2013/046688, mailed on Jun. 25, 2015, 9 pages.
International Preliminary Report on Patentability and Written Opinion Received for PCT Patent Application No. PCT/US2013/046691, mailed on Jun. 25, 2015, 7 pages.
International Search Report and Written Opinion received for PCT Patent Application No. PCT/US2013/046688, mailed on Sep. 27, 2013, 13 pages.
International Search Report and Written Opinion received for PCT Patent Application No. PCT/US2013/046691, mailed on Sep. 27, 2013, 10 pages.
Office Action received for Chinese Patent Application No. 201380004555.7, mailed on Feb. 14, 2016, 9 pages of Chinese Office Action only.

\* cited by examiner

| MAC Destination Address |
| --- |
| MAC Source Address |
| IP Destination Address |
| IP Source Address |
| TCP Destination Port |
| TCP Source Port |
| Sequence Number |
| Acknowledgement Number |
| Flags – including new ALLOW_NACK Flag |

| MAC Destination Address |
| --- |
| MAC Source Address |
| IP Destination Address |
| IP Source Address |
| TCP Destination Port |
| TCP Source Port |
| Sequence Number = N/A |
| Acknowledgement Number = Original Sequence No. |
| Window Size = length of dropped segment |
| Flags – NACK (new flag) |

NOTIFICATION BY NETWORK ELEMENT OF PACKET DROPS

FIELD OF THE INVENTION

The field of invention relates generally to computer networking and, more specifically but not exclusively relates to techniques for notification of packet drops by network elements such as switches and routers.

BACKGROUND INFORMATION

Computer networks are ubiquitous to today's computer usage. Increases in processor speeds, memory, storage, and network bandwidth technologies have resulted in the build-out and deployment of networks with ever increasing capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, and addition to the deployment of massive data centers to support these services which employ private network infrastructure. Additionally, the new generation (i.e., 4G) of mobile network data services is expected to significantly impact the utilization of both wireless and land-line networks in the near future. The result of these and other considerations is that the utilization of computer networks is expected to continue to grow at a high rate for the foreseeable future.

In general, network traffic can be broadly categorized into two categories: reliable data traffic and best-effort traffic. For transmission of reliable data traffic, techniques are employed to ensure that the data received at a destination endpoint is the same as the data sent from a source endpoint—in other words, techniques are employed to ensure reliable delivery of the original data to the destination. Examples of this type of traffic include transmission of data files and the like. For best-effort traffic, packets are forwarded using techniques that emphasize delivery speed over reliability. Examples of best-effort traffic include streaming multimedia content and Voice over Internet (VoIP) traffic.

The most common technique for supporting reliable data traffic employs the Transmission Control Protocol (TCP). TCP is the protocol used by major Internet applications such as the World Wide Web, email, remote administration and file transfer. It is also used for reliable data delivery on all sizes of networks ranging from private LANs to enterprise WANs to the Internet itself.

TCP is one of the core protocols of the IP (Internet Protocol) Suite, and is implemented in combination with IP using a network "stack" at each TCP connection endpoint. More particularly, a TCP connection is typically managed by an operating system through a programming interface that represents the local end-point for communications, the Internet socket (also referred to as a TCP socket). TCP supports reliable transmission of data through the combined use of sequence numbers in the TCP segment headers and ACKnowledgement schemes. When transmitting data, such as a file, the TCP socket component segments the data into chunks and adds a TCP header, creating a TCP segment. The TCP segment is then encapsulated into an IP datagram. The IP datagrams including TCP segments are informally called IP packets or simply packets, and this terminology is used herein, noting that under the IP standard (RFC 791) a segment refers to a TCP Protocol Data Unit (PDU) to the IP PDU and frame to the data link layer PDU.

Conventional uses of TCP are shown in FIG. 1, which includes a source computer 100 connected to a destination computer 102 via an IP network 104 including a plurality of nodes comprising network elements (e.g., switches 1-20) connected via links 106. For illustrative purposes, one-way communication between source computer 100 and destination computer 102 is depicted, with the recognition that communication between these computers would be bi-directional. Source computer 100 and destination computer 102 operate as TCP endpoints, and each includes a network stack including a TCP socket and an IP Stack. This is depicted by a source a TCP socket 108, and an IP stack 110 implemented on source computer 100 and a destination TCP socket 112 and IP stack 114 implemented on destination computer 102.

After a TCP connection is established between source computer 100 and destination computer 102, the source computer begins to stream packets 1-7 sequentially toward destination computer 102 via IP network 104. The switches and routers in an IP network are configured to forward packets using routing/forwarding tables that forward traffic based on packet classification data, wherein a baseline level of forwarding is typically based at least on the destination IP address in the packet header (which in this example corresponds to the address of destination computer 102). Packet forwarding is done using a hop-by-hop routed path, an example of which is depicted as a path 116 via nodes 1-2-4-5-6-7-8. An alternative path 118 is depicted via nodes 1-9-10-11-12-13-14-8.

The current TCP protocol facilitates reliable transmission by primarily using a cumulative acknowledgement scheme, where the receiver sends an acknowledgement (ACK) signifying that it has received all data preceding the acknowledged sequence number without error. A retransmission timeout timer is associated with each packet that is transmitted from a source, and source TCP socket 108 employs a timeout timer 120 to determine when to retransmit packets for which ACKs have not been received within the timeout period for those packets. Under another scheme, in response to receiving an out-of-order packet TCP receivers may send Selective ACKnowledgements (SACK) or a Double ACK to request retransmission of a packet.

During network transmission, packet drops may occur for various reasons, such a for bit errors or if a switch has inadequate buffer space due to local network congestion. An example of a packet drop for packet 4 shown by an X at switch 5 in FIG. 1. In the event of a packet drop, the timer-based ACK approach creates a long delay before a packet is retransmitted. Under an out-of-order condition, retransmission requests should wait to see if the out-of-order packet has been rerouted along a different path than other packets in the flow, causing a delay in delivery. Thus, retransmission is not immediately requested. Under both approaches, a packet drop causes a long latency prior to retransmission, reducing the effective bandwidth of the link.

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1 is a schematic diagram illustrating communications between a source and destination computer over an IP network using TCP/IP, further illustrating details of operations performed by the source and destination computers in response to timer-based detection of dropped packets FIG. 2 is a schematic diagram illustrating a similar network to that shown in FIG. 1, wherein a network switch is configured to return a dropped packet notification message to a source in response to dropping a packet, and the source retransmits the packet in response to receiving the dropped packet message;

FIG. 3 is a diagram illustrating selected header fields included in one embodiment of an ALLOW_NACK packet;

FIG. 4 is a diagram illustrating selected header fields included in one embodiment of a NACK packet returned to a source;

DETAILED DESCRIPTION

Embodiments of methods and apparatus for notification of packet drops by switches and routers are described herein. In the following description, numerous specific details are set forth, such as implementations employing TCP, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments disclosed herein, network elements such as switches and routers are configured to detect occurrences of dropped packets and return indicia to the sources of such packets and, optionally, destinations of the packets indicating which packets were dropped. The socket logic in the network stack of networking software or embedded logic in hardware is augmented to process messages containing the indicia and retransmit the dropped packets without having to wait for the retransmission timeout timer for the packets to expire. The socket logic is also augmented to include indicia in the packets it transmits indicating it can handle the packet dropped messages.

Figure 1:
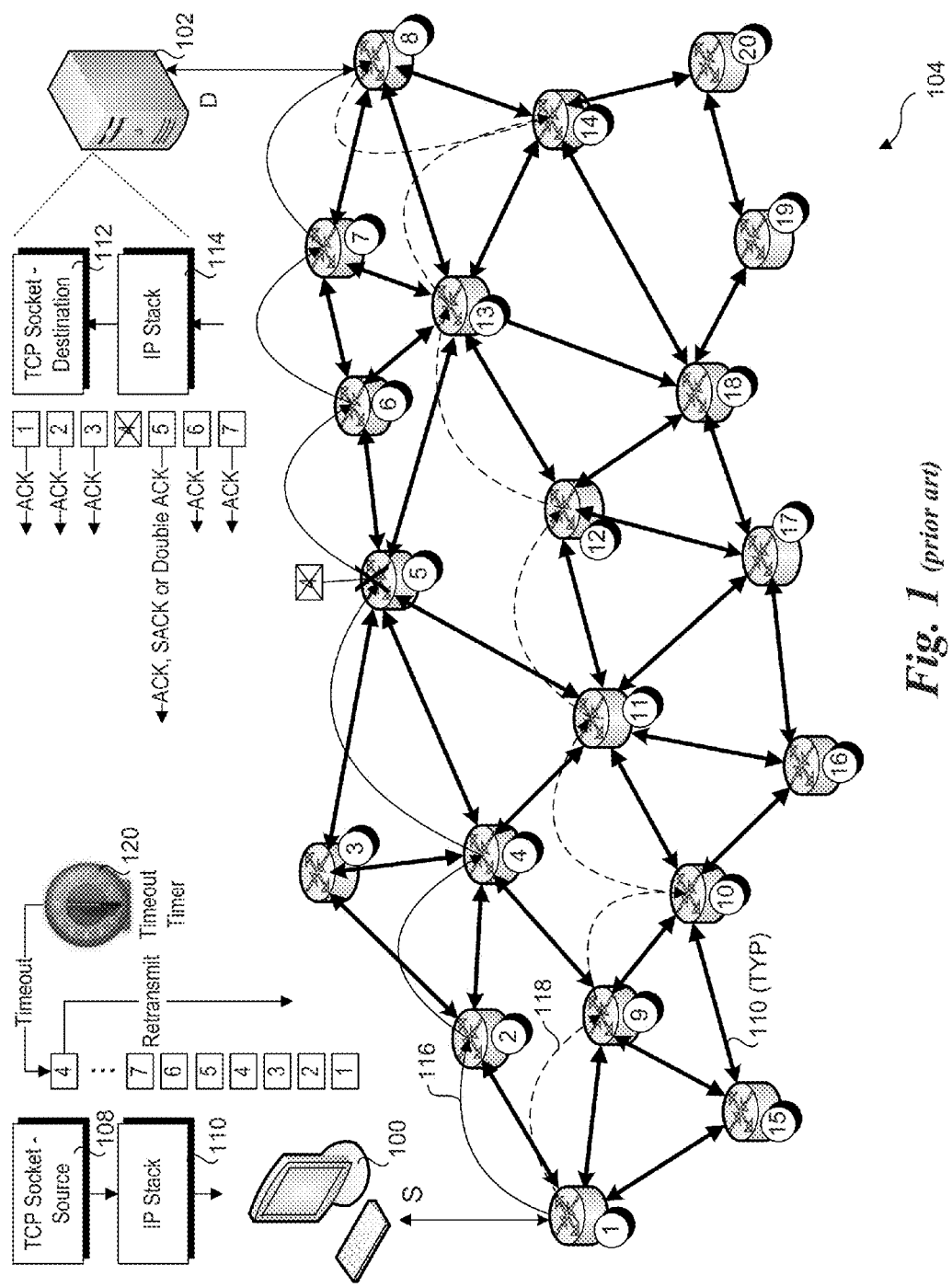
Figure 2:
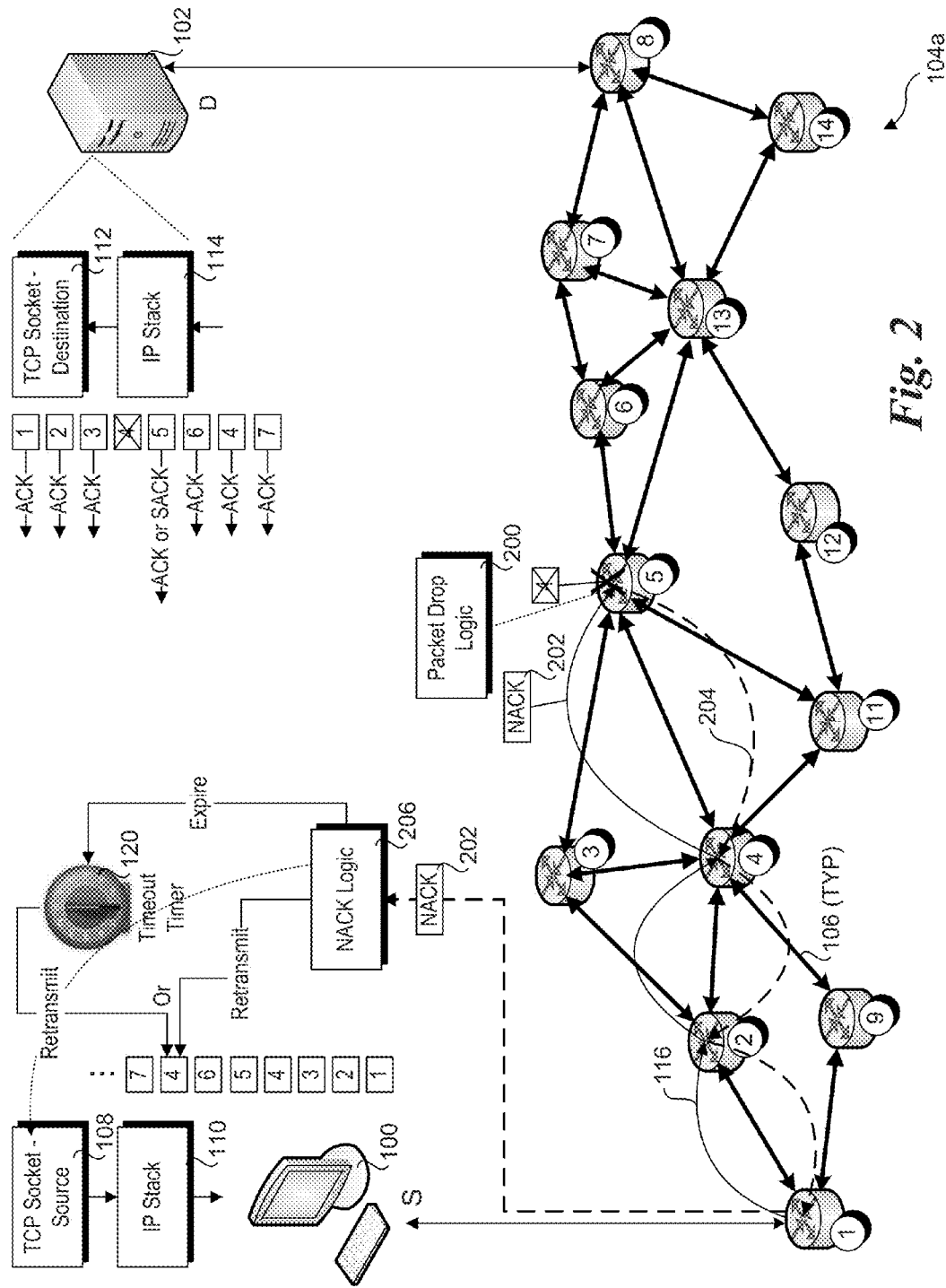
FIG. 2a is a schematic diagram illustrating an extension to the embodiment shown in FIG. 2, wherein the network switch sends a second dropped packet notification message to the destination computer.

FIG. 2 shows an exemplary implementation of one embodiment of the foregoing technique. FIG. 2 shows a network 104a that is similar to network 104, except some of the switches have been augmented with packet drop logic 200, such as depicted for switch 5. As before (i.e., as described above under the conventional approach of FIG. 1), packets are sent from source computer 100 to destination computer 102 via network 104a using a multi-hop route path traversing a number of the switches, such as illustrated by route path 116. Also as before, packet 4 is dropped at switch 5. This may occur for several reasons, such as due to network congestion under which switch 5 selectively drops packets or detection of corrupted packet data.

Under the conventional approach described above for FIG. 1, upon dropping packet 4 switch 5 would be done with processing packet 4, and eventually a copy of packet 4 would be retransmitted from source computer 100 after the retransmission timeout timer 120 for packet 4 expires. This may introduce a lengthy latency for each packet that needs retransmission.

In contrast to the conventional approach, under the embodiment shown in FIG. 2 a dropped packet notification message comprising a "NACK" (Negative ACKnowledgement) packet 202 is generated by packet drop logic 200 in response to detection of a dropped packet (in this instance packet 4). The NACK packet 202 is forwarded from switch 5 to source computer 100 using conventional network forwarding, as depicted along a path 204 in FIG. 2. Upon receiving NACK packet 202, it is processed by IP Stack 110 in the conventional manner. Meanwhile, TCP socket 108 has been augmented with NACK logic 206, which is configured to detect and process NACK packets. Accordingly, when NACK packet 202 is processed by TCP socket 108, NACK logic 206 identifies the packet as a NACK packet, determines which packet NACK packet indicates has been dropped, and retransmits that packet (e.g., retransmits packet 4). In one embodiment, retransmission is effected by causing retransmission timeout timer 120 for the dropped packet (packet 4) to immediately expire, which invokes a retransmission of the packet using conventional TCP socket logic. Under another approach, NACK logic 206 is configured to invoke retransmission of the dropped packet on its own, while resetting the retransmission timeout timer value for packet 4 in accordance with a timeout corresponding to retransmission of the packet.

As discussed above, the NACK dropped packet schemes are facilitated by augmenting conventional TCP socket logic and network element packet processing logic. The TCP socket logic is augmented for both transmitting packets and receiving NACK packets. The reason for augmenting transmitted packets is to inform a network element that the TCP socket supports use of NACK. In general, indicia may be added to the header of transmitted packets to indicate support for use of NACK.

FIG. 3 depicts selected header fields 300 corresponding to a packet that provides indicia via use of an ALLOW_NACK flag indicating that the sender (i.e., source) supports the NACK extended functionality. Header fields 300 include conventional packet header fields depicted without shading, including MAC (Media Access Channel) Destination and Source Addresses, IP Destination and Source Addresses, TCP Destination and Source Ports, a Sequence Number, and an Acknowledgement Number. ALLOW_NACK is a new flag that may be implemented in a TCP Header in the optional TCP Options field or as part of a flag bit in a new TCP header format. For example, the current TCP standard defines 8 flag bits, each corresponding to a respective TCP flag (C E U A P R S F). A Reserved field is adjacent to these TCP flags, and in one embodiment the Reserved field is modified to include an ALLOW_NACK flag.

FIG. 4 depicts selected header fields 400 corresponding to one embodiment of a NACK packet that is returned to a source endpoint from a network element that is configured to return NACK packets to NACK-enabled sources in response to dropped packets. As with header fields 300, header fields 400 includes conventional header fields shown without shading, including MAC (Media Access Channel) Destination and Source Addresses, IP Destination and Source Addresses, TCP Destination and Source Ports, a Sequence Number, an Acknowledgement Number, and a Window Size. Also shown is a new NACK flag (depicted with shading). As with the ALLOW_NACK flag, the NACK flag may be implemented in the TCP options field, or as a flag bit in a new TCP header format.

In the illustrated embodiment of FIG. 4, the NACK packet Sequence Number value is ignored by the receiver (e.g., a TCP socket for a source computer), while the Acknowledgement Number is set to the Original Sequence Number (i.e., the Sequence Number for the packet to be dropped). The Window Size is set to the length of the dropped segment.

Figure 5:
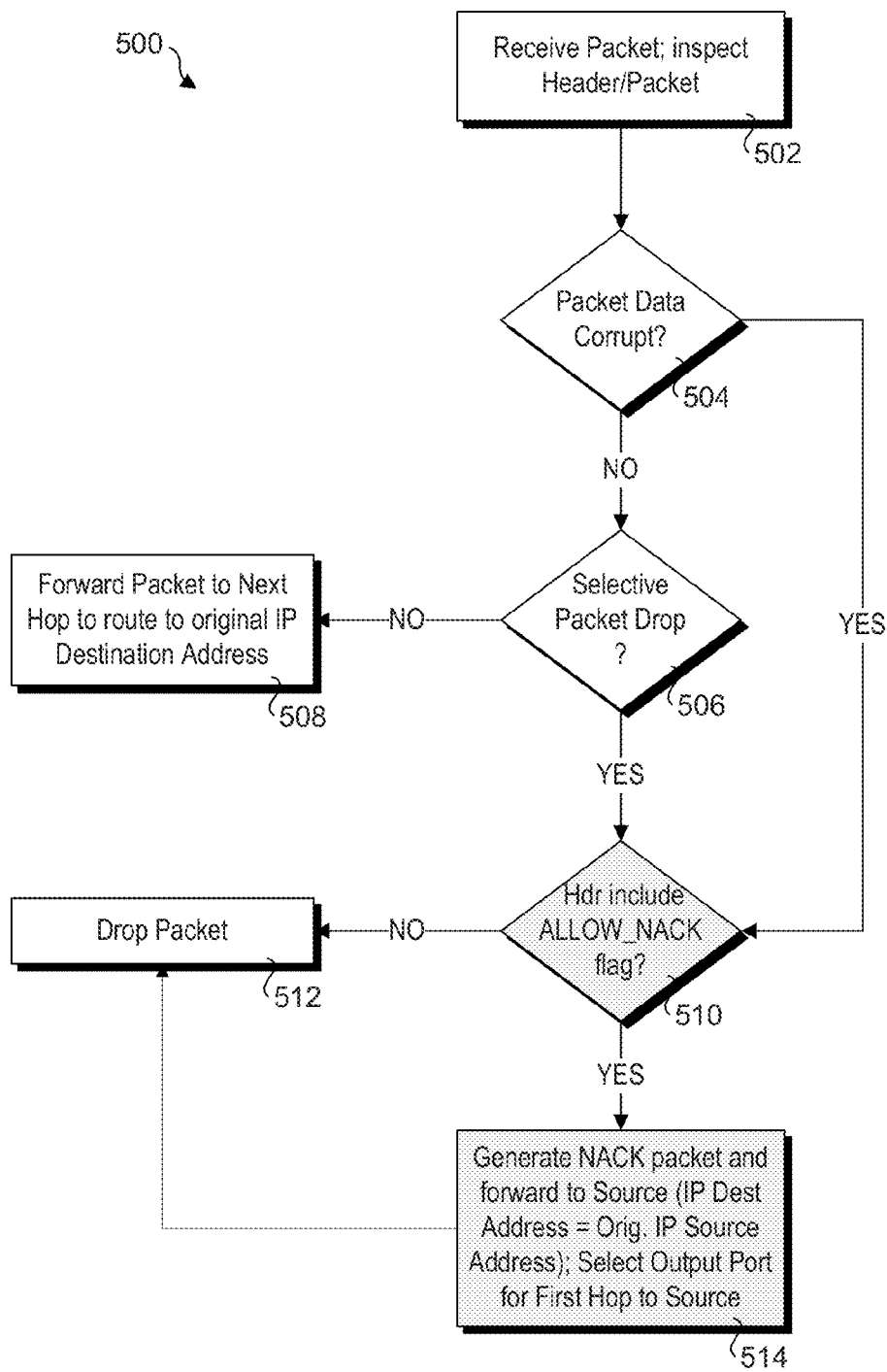
FIG. 5 is a flowchart illustrating operations and logic performed by a network element configured to support NACK operations, according to one embodiment.

FIG. 5 shows a flowchart 500 illustrating operations and logic performed during packet forwarding by a network element that supports NACK functionality, according to one embodiment. The process begins in a block 502, wherein a packet is received at an input port of the network element, and buffered. In accordance with conventional operations the packet header is inspected to perform packet classification and to obtain the Checksum value for the packet and a Checksum check is performed to determine if the packet data has been corrupted in a decision block 504. Normally, the packet data will not have been corrupted, and the logic will proceed to a decision block 506 in which a determination is made to whether to selectively drop the packet. For example, packets may be selectively dropped due to network congestion, lack of buffer space for a given flow classification or level of service, etc. Under typical conditions, the packet will not be selectively dropped, and will be forwarded in the conventional manner in a block 508. This will usually involve a forwarding table lookup of the output port to be used for the next hop along the route path used to forward the packet. For example, forwarding tables contain filters and rules for filtering or matching criteria that is typically obtained during packet classification, such as a 5-tuple hash on selected fields for the packet header. This foregoing process corresponds to conventional packet forwarding operations that will generally be applied to most packets.

Returning to decision blocks 504 and 506, if it is determined that either the packet data is corrupted or the packet is to be selectively dropped, the logic proceeds to a decision block 510 in which a determination is made to whether the packet includes indicia indicating the NACK function is supported by the sender, e.g., through existence of an ALLOW_NACK flag. If the ALLOW_NACK flag or other indicia indicating the NACK function is supported is not present in the packet header, the packet is simply dropped in the conventional manner, as depicted by a block 512. Conversely, if the packet contains indicia indicating the NACK function is supported, a NACK packet is generated in a block 514. In one embodiment, the NACK packet header will includes NACK fields 400 of FIG. 4 (in addition to other header fields that are not shown), wherein the IP Destination Address will correspond to the IP Source Address of the source from which the packet to be dropped originated from. Once the packet is generated, a forwarding table lookup is performed to determine the output port on the network element to forward the packet out of. Optionally, since the appropriate port will usually be the same port on which the packet was received, the packet may be forwarded via that port without a forwarding table lookup. The logic then proceeds to block 512 to drop the packet, completing processing of the packet.

Figure 6:
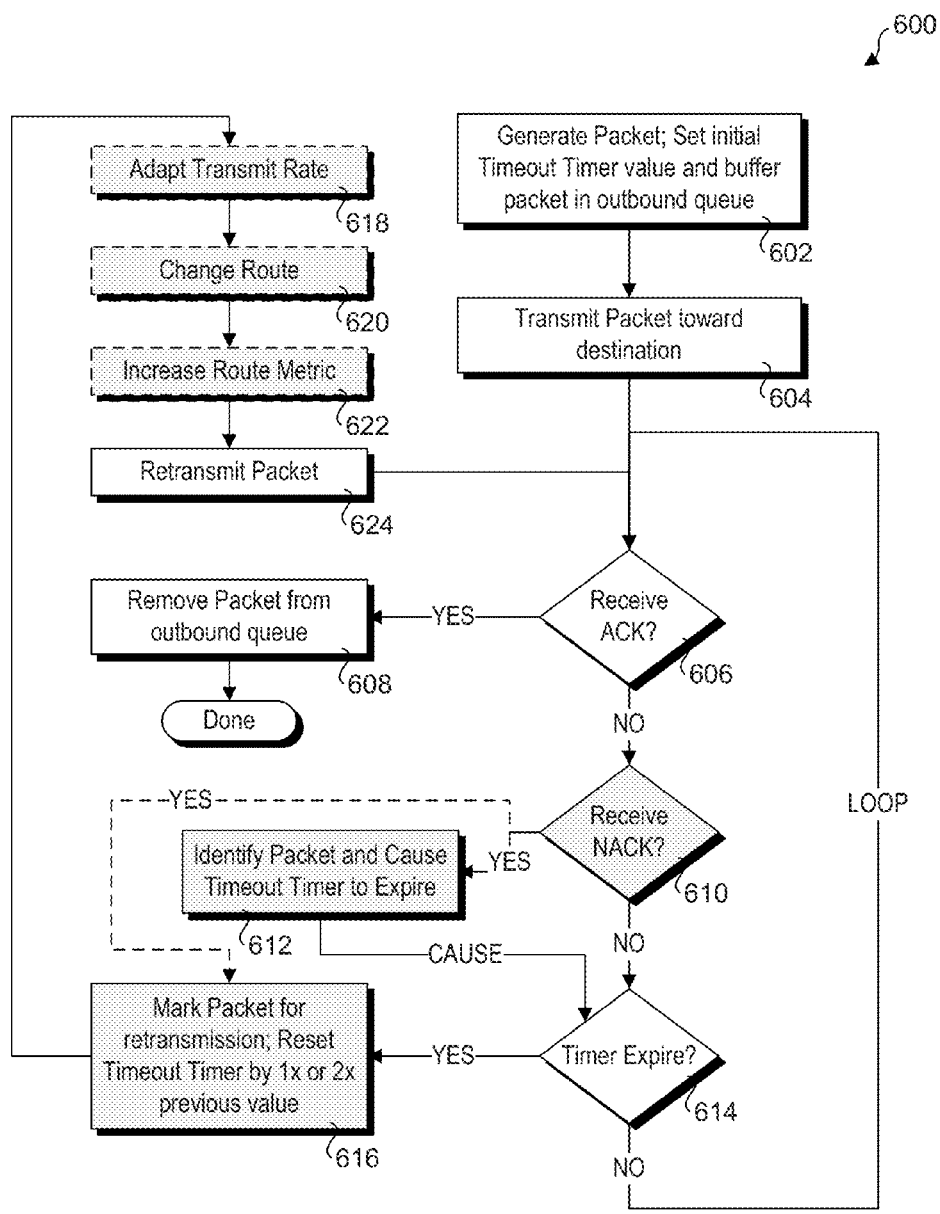
FIG. 6 is a flowchart illustrating operations and logic performed by a source computer configured to support NACK operations, according to one embodiment.

In addition to operations performed by network elements, implementation of the NACK functionality involves corresponding operations on source devices (e.g., source computer 100 in the present example). As discussed above, source computer 100 employs a network stack including a TCP socket 108 and IP stack 100. In one embodiment, TCP socket 108 is modified to include NACK logic 206 to facilitate NACK functionality according to operations and logic depicted in a flowchart 600 of FIG. 6.

The flowchart process starts at a block 602 in which a packet is generated and buffered in an output queue. TCP employs a streaming connection between TCP socket endpoints, wherein the outbound stream is typically generated by a software entity on the source computer. TCP uses a sliding window approach, and TCP segments are generated from content to be streamed (e.g., a file). In accordance with the OSI layer model, the packet data is generated from the top of the network stack downward, with each OSI layer encapsulating the packet data that was generated by the layers above it. The portion of the packet data that is generated by TCP Socket 108 includes the TCP header fields and the segment of data (i.e., the packet payload) to be transferred in the packet. In connection with generating the TCP segment, a retransmission timeout timer value is associated with the segment. Additional packet generation operations are performed by IP stack 110, and the packet is buffered in an outbound queue.

Generally, a software-based outbound queue will be maintained for each TCP connection, with packet data being DMA'ed (Direct Memory Accessed) into an output buffer on the source computer's Network Interface Controller (NIC) prior to transmission. Depending on the configuration of the NIC, management of the packet transmission processes may be controlled by a software-entity and/or embedded logic in the NIC itself.

The next operation is depicted in a block 604, wherein the packet is transmitted toward its destination. Source computer 100 is an endpoint device representative of any type of computing device capable of communicating data via a network connection. This generally includes various types of computer and servers (desktop, laptop, netbook, ultrabook, workstations, servers of various types, etc.), as well as mobile devices with data connections (mobile phones, tables, portable music players, portable gaming devices, etc.). Landline devices and devices connected via a wireless LAN (local area network) will typically be connected to a network via a single outbound port on the devices' NIC (or wireless interface if using a wireless connection to the LAN). For mobile devices, network connection (when not using a WLAN connection) is via a mobile service provider network, wherein there is a single physical output port for outbound data traffic from the device.

For each of the foregoing devices, the routing aspect for outbound traffic is fairly simple, as there will typically be only a single output port, and routing decisions (e.g., for Internet traffic) are handled by network devices that are closer to the core network. In cases where the source device is a server, the server may employ one or more NICs, each with one or more output ports. Under these situations, a server may select an appropriate output port to use to transmit a given packet.

In addition to the configuration shown in FIG. 2, there may also be instances in which a source computer is a network element, such as one of switches 1-20. In this case, the network element will typically use a forwarding table lookup to determine which port to forward the packet from.

The next three operations shown in flowchart 600 correspond to a continuous loop during which determinations are made for the depicted decision blocks on an ongoing basis until a completion event is detected. In a first decision block 606, a determination is made to whether an ACK has been received for the packet. Under TCP, delivery confirmation is made via ACKs, as discussed above; thus in response to receiving an ACK the packet is removed from the outbound queue in a block 608 and handling of the packet at source computer 100 is completed.

Another packet that a source may receive is a NACK packet, as depicted in a decision block 610. In response to receiving a NACK, the flowchart logic proceeds to a block 612 in which the packet corresponding to the NACK is identified and the retransmission timeout timer associated with the NACK is caused to expire, resulting in the flowchart logic proceeding to a decision block 614 corresponding to timeout timer expiration. During normal TCP operations, the timeout timer is used in the manner describe above to automatically cause retransmission of a packet when the timeout timer for the packet expires. Under conventional TCP practice, the initial time for a retransmission timeout timer is determined on an individual connection basis using round-trip time (RTT) measurements for the connection, and setting the initial time offset as a function of the RTT measurements. For subsequent retransmission timeouts, the immediately prior timeout timer value for a given packet is multiple by 2 to effect an exponential backoff.

Returning to block 612, a timeout timer for a packet may be caused to expire by setting the timeout timer value to the packet equal to the current timeout clock value, which will result in expiration of the timeout timer for the packet the next time packet timeout for the packet is checked. In one embodiment, from the perspective of the timeout mechanism employed by the TCP socket, it is indifferent to how the timer expires and proceeds to block 616 to mark the packet for retransmission. Under a conventional implementation, the timeout timer value would be increased by 2× (i.e., doubled) the previous value. However, under one embodiment logic may be added to detect the timeout expiration was generated as a result of a bit error (e.g., indicated in the NACK), and thus it was not due to a normal timeout expiration as a result of a packet dropped due to network congestion, and the timeout timer is simply reset to its previous (i.e., immediately preceding) value. It is noted that since a bit error may correspond to an error in either the header or the payload and thus could conceivably be an error in the source address field, in one embodiment a NACK is not returned in response to detection of a bit error for a packet. As another option, logic may be implemented via the TCP socket to cause the packet to be marked for transmission and the timeout timer is reset without employing the conventional timer expiration logic, as depicted by the dashed line from decision block 610 to block 616.

In connection with retransmission of the packet there are various optional operations that may be performed prior to retransmission of the packet in a block 624. These include adapting the transmit rate in a block 618, changing the route in a block 620, and increasing a route metric in a block 624. Alternatively, routers may track NACK packets that passes through them to update their metrics. If a source has two paths that it can take (e.g. two ports), then it can be used by the source also. Under instances where a significant percentage of NACKs are being received due to network congestion, it may be advantageous to back off the transmit rate for the connection. In some embodiments various information in addition to indicating a packet has been dropped may be provided in a NACK packet, such as the reason it was dropped (e.g., bit error, network congestion, etc.), and/or identification of the route path segment to the network element that dropped the packet. In the event of a packet being dropped because of a bit error, there may be no need to adapt the transmission rate since bit errors are typically not a function of transmission rates but rather are a function of link bit error rate (BER).

Depending on the type of the source device and/or where it is located in or relative to the network, it may be possible to change the route or increase the route metric. Generally, endpoint devices such as computers connected to the internet using an Internet Service Provider (ISP) or a mobile device connected to a data network via a mobile data service have no or little control for effecting the routing path for a given packet or a packet flow. By design, routing in an IP network such as the Internet is dynamic, and the routing/forwarding decisions are made by the network elements as opposed to endpoints connected to a network.

If the source device is another network element or otherwise supports facilities for effecting route changes and/or route metrics, then such devices may implement one or both of these facilities in blocks 620 or 622. For example, increasing a route metric may result in forwarding table filters in various network elements to be updated to avoid or otherwise reduce use of one or more path segments, thereby reducing traffic using those path segments. This may have the effect of reducing the occurrence of packet drops at network elements having ports coupled to these path segments. Alternatively, a network element may track NACK packets flowing through the element and update the routing metrics using NACK occurrence statistics.

Returning to flowchart 600, once a packet is retransmitted, the flowchart logic returns to the loop including decision blocks 608, 610, and 614, and the loop processing operations are repeated. Generally, a packet may be retransmitted multiple times until an ACK is received or the connection is taken down or reset.

In addition to the decision blocks shown in the loop, there is also other conventional logic used to detect various events, such as receiving a SACK packet. One having skill in the art will know how to implement such logic and, accordingly, details of such implementations are not shown in order to not obscure the inventive aspects of the embodiments disclosed herein.

Selective acknowledgements allow receivers to acknowledge discontinuous blocks of packets that were received correctly, in addition to the sequence number of the last contiguous byte received successively, as in the basic TCP acknowledgment. The acknowledgement can specify a number of SACK blocks, where each SACK block is conveyed by the starting and ending sequence numbers of a contiguous range that the receiver correctly received.

Under conventional operations, SACKs are sent from a destination to a source upon detection of an applicable threshold, such as not receiving a packet within a sequence of patents prior to expiration of a time threshold. One reason for not immediately sending a SACK in response to a missing (in the sequence) packet is that since routing via an IP network is dynamic, an out of order packet may simply be routed via a longer (latency) path and received shortly after other packets in the sequence that are routed via shorter (latency) paths.

The conventional logic employed by a destination TCP socket will send a SACK under applicable circumstances, such as not receiving a "missing" (in the sequence order) packet within a time threshold. As such, the use of NACK messages that are sent to sources may have little or no effect on the usage of SACKs. However, in one embodiment the NACK scheme is extended to the destination TCP sockets such that when a NACK is generated by a network element in response to dropping a packet and sent to a source TCP socket a companion NACK is generated by the network element and sent to the host device for the destination TCP socket (e.g., destination computer 102).

Figure 2A:
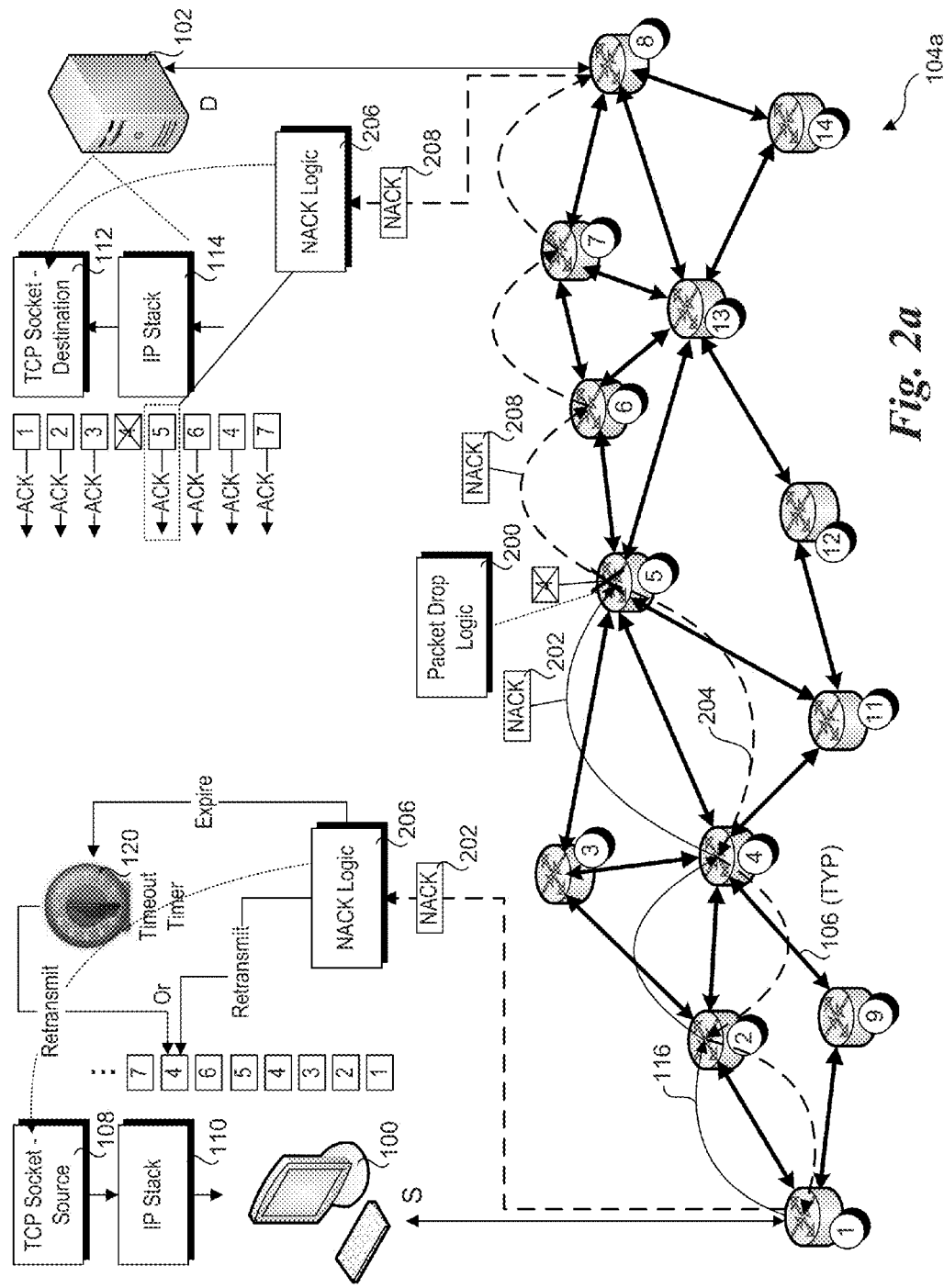

Further details of this approach are shown in the embodiment illustrated in FIG. 2*a*. As with the embodiment illustrated in FIG. 2, in response to a dropped packet switch 5 employs packet drop logic 200*a* and returns a NACK packet 202 to source computer 100 advising the TCP socket 108 that a packet has been dropped and identifying the packet. For this embodiment, this first NACK will be referred to as a source NACK, that is, a NACK sent to the source. A similar destination NACK (packet) 208 is generated by packet drop logic 200*a* and is sent from switch 5 to destination computer 102, where it is processed by IP stack 114 and destination TCP socket 112 using NACK logic 206*a*, which now has been extended to support receipt of destination NACK packets. Upon receipt of a destination NACK packet, which includes indicia identifying the TCP segment that was dropped, NACK logic 206*a* will update the SACK data for the segment to indicate that a NACK has already been sent to source computer 102. Since the NACK for a given TCP segment will contain similar information to a SACK for the segment, the return of a SACK would be redundant and is thus pre-empted.

In one embodiment, the logic for pre-empting a SACK is similar to that use for causing a timeout timer to expire. Information for the missing packet (e.g., packet metadata) is updated to reflect a situation where a SACK has been sent, while not actually sending a SACK. By using this approach, the rest of the logic remains the same, and a subsequent SACK for the packet will be sent if the retransmitted packet does not reach the destination TCP socket prior to the SACK threshold timer expiring. Since the path used to route the retransmitted packet may be different and/or the retransmitted packet may be dropped at a switch that does not support NACK functionality, it is advantageous to employ the conventional SACK logic for subsequent attempts to transmit the packet to the destination.

In addition to implementing the techniques disclosed in the embodiments illustrated herein for TCP, similar techniques may be implemented for other reliable protocols, such as SCTP (Stream Control Transmission Protocol). In addition, for protocols based on lossless transports such a FCoE (Fibre Channel over Ethernet), a NACK-type packet returned to a sender may be used to indicate the entire transaction is compromised and should be restarted.

Security Considerations

A malicious agent may use a NACK-type mechanism to cause spurious retransmissions. To reduce the possibility of such attacks, the following operations may be implemented:
1. A firewall may drop such NACK packets. This will prevent attacks from the outside, but will also prevent notification on drops from external switches. However, if smart firewall logic is employed, it may be possible to filter NACKs received from malicious agents as opposed to legitimate NACKs.
2. Switches may drop NACK packets if received from end stations (e.g., endpoints comprising computers and devices that are not network elements).
3. A TCP socket may ignore such packets if an ACK is received from an endpoint on a packet previously NACKed.

Hardware-Based Implementations

In the embodiments illustrated in FIGS. 2 and 2*a*, the TCP sockets and NACK logic is described as being implemented by an operating system network stack. Optionally, all or a portion of similar functionality may be implemented via hardware, or a combination of software and hardware. For example, some NICs include embedded logic for facilitating a network stack including TCP socket logic on the NIC itself. Under a typical implementation, an operating system network stack may be employed for initially generating packet streams (in cooperation with other software entities, such as software applications), while the TCP socket logic on the NIC is employed for facilitating confirmed delivery of the packets, including handling packet retransmission operations. Accordingly, under this approach, embedded logic and/or firmware on the NIC employed for implementing TCP socket operations may be augmented to facilitate the NACK functionality described herein.

Exemplary Network Switch Architecture

As discussed herein, various operations to facilitate notification of packet drops are implemented on a network element. The terminology "network element" generally includes any element used to perform one or more of forwarding/routing/switching operations in a computer network, including switches, routers, bridges, etc. Typically, the most common type of network element is a commonly referred to as a switch, such as a telecom switch in an IP-based telecommunications network.

Figure 7:
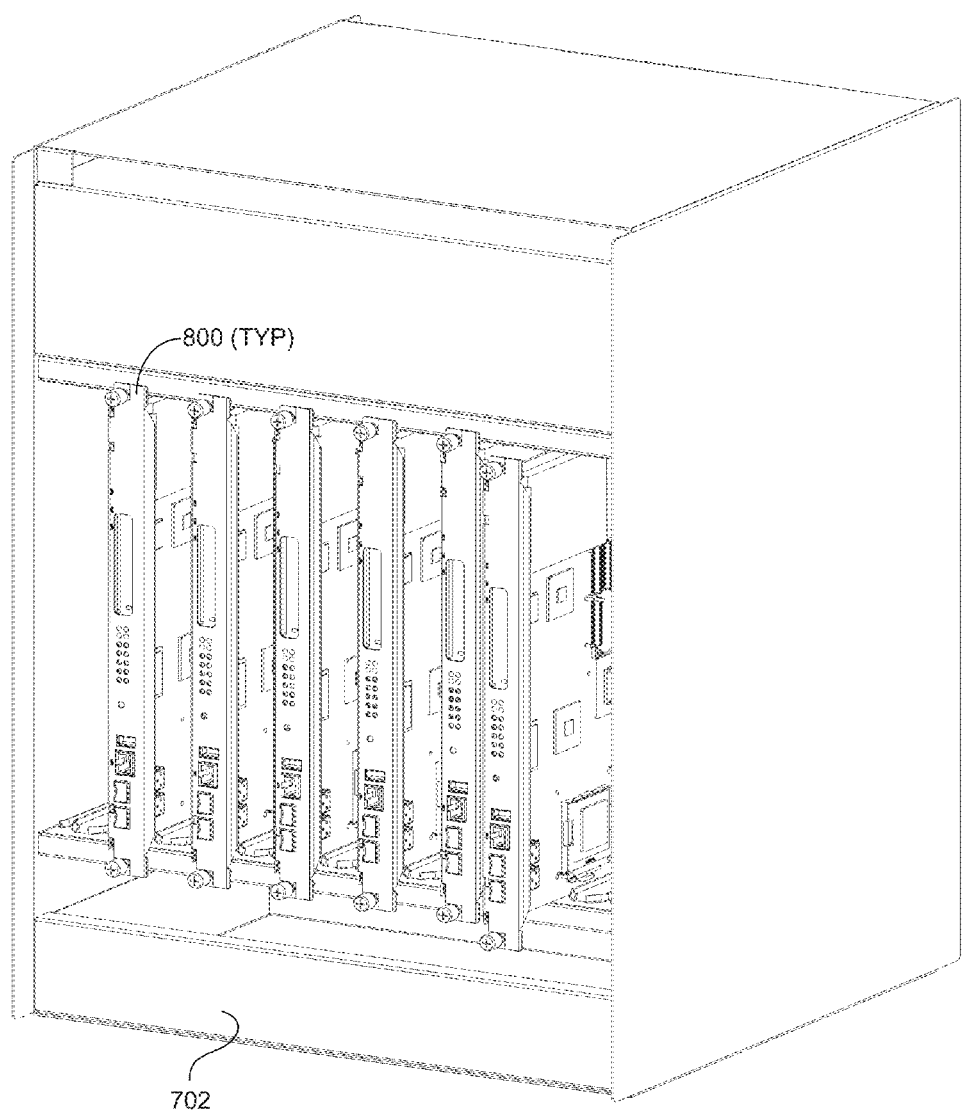
FIG. 7 is a schematic diagram of a network switch, according to one embodiment.
Figure 8:
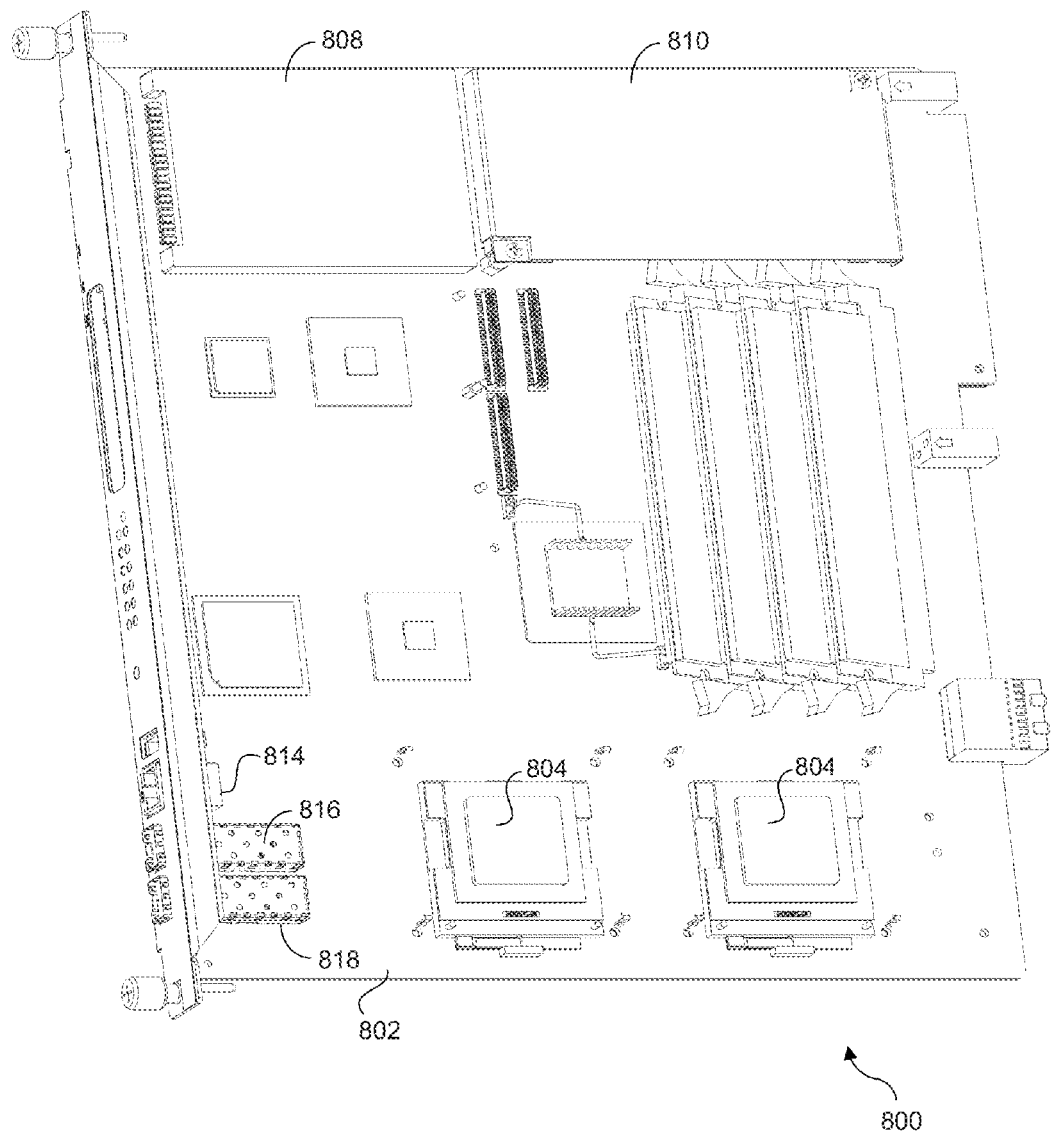
FIG. 8 is a schematic diagram of a line card in the network switch of FIG. 7.

FIGS. 7 and 8 respectively show a switch 700 and switch line card 800 that are illustrative of components employed in one embodiment of network element configured to support NACK operations. Switch 700 comprises a chassis 702 in which a plurality of switch line cards 800 are installed in respective slots. For simplicity, the switch line cards 800 illustrated in FIG. 8 are depicted as having the same configuration; however, one of skill in the art will recognized line cards having different configuration may be employed in the same switch chassis.

As shown in FIG. 8, switch line card 800 includes a main board 802 on which a plurality of components are mounted or otherwise coupled via a socketed connection, including one or more processors 804 and memory modules 806. Also shown coupled to main board 802 are a mass storage device 808 and a daughter board 810. Mass storage device 808 may typically comprise a hard disk drive or a solid state drive. Daughter board 810 exemplifies various types of boards or modules that may be coupled to main board 802 to provide auxiliary functions, and is optional. Main board 802 further includes a connector 812 that is coupled to a backplane in switch chassis 702 (not shown) when the switch line card is installed in its slot. The backplane is configured to enable the switch line cards to communicate with one another and with other facilities in the switch. Switch line card 800 also includes various connectors for coupling to network links, such as depicted by an RJ-45 connector 814 and optical connectors 816 and 818.

The operations and logic implemented by embodiments of the network elements disclosed herein may typically be implemented via instructions, such as software and/or firmware instructions, executed on one or more of processors 804 or other processing components or logic on switch line card 800. In various embodiments, processors 804 may comprise general purpose processors including single core and multi-core processors, or may comprise special-purpose processors, such as network processors that are configured to facilitate packet-processing using a pipelined architecture.

Switch 700 is illustrative of a switch configuration for a switch that is implemented in a large scale network. However, this is not to be limiting, as switch apparatus with more simplified configurations may be implemented in other types of networks, such as Ethernet Local Area Networks (LANs) and Wide Area Networks (WANs). In addition, switches may be implemented in other types of networks, such as storage networks employing standardized or proprietary network protocols. For example, such a switch apparatus would typically include components similar to that shown for switch line card 800, which is illustrative of one embodiment of a switch apparatus. Thus, a standalone switch may comprise a main board on which various components are mounted or otherwise operatively coupled including one or more processors, memory, storage device(s), input and output ports, with the storage device(s) storing instructions configured to be executed by the one or more processors to facilitate NACK operations.

Aspects of the embodiments disclosed herein may be implemented in network elements and socket logic to provide several advantages over conventional approaches. For example, the round trip for a drop notification (e.g., a SACK) is shorter, as the network element returning the notification is closer to the source than the destination endpoint. The techniques allow a network element to influence TCP flow with no need to keep a state of the TCP/IP connection. The techniques are transparent to legacy equipment, and thus may be implemented even if only a portion of sources and network elements are configured to implement them. Aspects of the technique may be implemented via software, without requiring any changes to existing NICs. Optionally, aspects of the technique may also be implemented in hardware without requiring any changes to current networking software.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a server or firmware executed by an embedded processor on a network element. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
   receiving, at a network element, a packet originating from a source computer and addressed to a destination that is not the network element;
   determining if the packet is to be dropped; and if the packet is to be dropped,
   returning a dropped packet notification message to the source computer containing indicia identifying the packet and indicating the packet has been dropped,
   wherein the dropped packet notification message comprises a packet having,
   a. a header including a plurality of Transmission Control Protocol (TCP) header flags, and the indicia indicating the packet has been dropped is contained in one of the TCP flags; or b. a header including a plurality of TCP header fields, and the indicia indicating the packet has been dropped is contained in a TCP options field.

2. The method of claim 1, wherein the dropped packet notification message comprises a packet having a plurality of header fields including an Internet Protocol (IP) Destination Address field, an IP Source Address field, a Transmission Control Protocol (TCP) Destination Port field, a TCP Source Port field, a Sequence Number field, an Acknowledgement Number field, and a Window Size field, wherein a data value in the Acknowledgement Number field is set to match a Sequence Number field value in the packet that is received, and the Window Size field contains data identifying a length of a dropped segment associated with the dropped packet.

3. The method of claim 1, wherein the dropped packet notification message comprises a Negative ACKnowledgement (NACK) packet.

4. A method, comprising:
receiving, at a network element, a packet originating from a source computer and addressed to a destination that is not the network element;
determining if the packet is to be dropped; and if the packet is to be dropped,
returning a dropped packet notification message to the source computer containing indicia identifying the packet and indicating the packet has been dropped,
determining whether the source computer supports handling of a dropped packet notification message from a network element that is not a destination for a packet; and
returning the dropped packet notification message to the source computer if it is determined the source computer supports the dropped packet message.

5. The method of claim 4, further comprising sending a second dropped packet notification message from the network element to the destination computer containing indicia identifying the packet and indicating the packet has been dropped.

6. The method of claim 4, wherein the dropped packet notification message comprises a packet including a header having a flag indicating the packet has been dropped.

7. A method comprising:
receiving a dropped packet notification message sent from a network element at a source computer containing indicia identifying a packet sent from the source computer and destined for a destination computer was dropped by the network element;
retransmitting the packet that was dropped from the source computer;
setting, prior to a first transmission of the packet that is retransmitted, a retransmission timeout timer used to mark the packet for retransmission upon expiration of the timeout timer if an ACK message has not been received from the destination computer prior to expiration of the timeout timer; and
in response to receiving the dropped packet message, causing the timeout timer to expire.

8. The method of claim 7, wherein the retransmission timeout timer comprises a Transmission Control Protocol (TCP) retransmission timeout timer that is implemented in a TCP socket hosted by the source computer.

9. The method of claim 8, wherein in connection with retransmitting the packet, the TCP retransmission timeout timer is set to an immediately preceding value.

10. The method of claim 8, wherein the dropped packet notification message comprises a packet including TCP header fields, and the TCP retransmission timeout timer employed for an immediately preceding transmission of the packet that was dropped comprise a current value, the method further comprising:
inspecting at least one of the TCP header fields to detect indicia identifying a reason the packet was dropped; and
if the indicia identifies the packet was dropped due to a bit error,
setting the TCP retransmission timeout timer to the current value; otherwise
setting the TCP retransmission timeout timer to 2 times the current value.

11. A method comprising:
receiving a dropped packet notification message sent from a network element at a source computer containing indicia identifying a packet sent from the source computer and destined for a destination computer was dropped by the network element;
retransmitting the packet that was dropped from the source computer;
in response to receiving the dropped packet message, changing a value in a header of the retransmitted dropped packet to cause the packet to be forwarded along a route path that does not employ the network element that dropped the packet when it was first transmitted.

12. The method of claim 11, further comprising:
determining a connection between the source computer and the destination computer used to transmit the packet that was dropped; and
in response to receiving the dropped packet message, adapting a transmit rate for the connection.

13. The method of claim 11, further comprising:
increasing a route metric for a route between the source computer and the destination computer that includes the network element that dropped the packet when it was first transmitted.

14. The method of claim 11, wherein the dropped packet notification message comprises a Negative ACKnowledgement (NACK) packet.

15. The method of claim 11, wherein the source computer includes a Network Interface Controller (NIC), and the method operations are implemented via embedded logic in the NIC.

16. A switch apparatus, comprising:
a main board having a plurality of components operatively coupled thereto, including,
at least one processor;
memory;
a plurality of input and output ports; and
at least one storage device having instructions stored therein configured to be executed by the at least one processor to cause the switch apparatus to perform operations, when operated in the network, comprising:
receiving a packet originating from a source computer and addressed to a destination that is not associated with the network element at an input port;
determining if the packet is to be dropped; and if the packet is to be dropped,
returning a dropped packet notification message to the source computer containing indicia identifying the packet and indicating the packet has been dropped, wherein the dropped packet notification message comprises a packet having,
  a. a header including a plurality of Transmission Control Protocol (TCP) header flags, and the indicia indicating the packet has been dropped is contained in one of the TCP flags; or
  b. a header including a plurality of TCP header fields, and the indicia indicating the packet has been dropped is contained in a TCP options field.

17. The switch apparatus of claim 16, wherein the dropped packet notification message comprises a packet having a plurality of header fields including an Internet Protocol (IP) Destination Address field, an IP Source Address field, a Transmission Control Protocol (TCP) Destination Port field, a TCP Source Port field, a Sequence Number field, an Acknowledgement Number field, and a Window Size field, wherein a data value in the Acknowledgement Number field is set to match a Sequence Number field value in the packet that is received, and the Window Size field contains data identifying a length of a dropped segment associated with the dropped packet.

18. A switch apparatus, comprising:
  a main board having a plurality of components operatively coupled thereto, including,
    at least one processor;
    memory;
    a plurality of input and output ports; and
    at least one storage device having instructions stored therein configured to be executed by the at least one processor to cause the switch apparatus to perform operations, when operated in the network, comprising:
      receiving a packet originating from a source computer and addressed to a destination that is not associated with the network element at an input port;
      determining if the packet is to be dropped; and if the packet is to be dropped,
    determining whether the source computer supports handling of a dropped packet notification message from a network element that is not a destination for a packet; and if so,
    returning the dropped packet notification message to the source computer containing indicia identifying the packet and indicating the packet has been dropped if it is determined the source computer supports the dropped packet message.

19. The switch apparatus of claim 18, wherein execution of the instructions perform further operations comprising sending a second dropped packet notification message from the switch apparatus to the destination computer containing indicia identifying the packet and indicating the packet has been dropped.

20. The switch apparatus of claim 18, wherein the dropped packet notification message comprises a Negative ACKnowledgement (NACK) packet.

21. A non-transient tangible machine readable medium having instructions stored thereon comprising configured to be executed on a computing device, and, when executed, cause the computing device to perform operations comprising:
  receiving a dropped packet notification message sent from a network element containing indicia identifying a packet sent from the computing device and destined for a destination computer was dropped by the network element;
  retransmitting the packet that was dropped toward the destination computer,
  setting, in connection to a first transmission of the packet prior to it being retransmitted, a retransmission timeout timer used to mark the packet for retransmission upon expiration of the timeout timer if an ACK message has not been received from the destination computer prior to expiration of the timeout timer; and
  in response to receiving the dropped packet message, causing the timeout timer to expire.

22. The non-transient tangible machine readable medium of claim 21, wherein the wherein the dropped packet notification message comprises a Negative ACKnowledgement (NACK) packet.

23. A non-transient tangible machine readable medium having instructions stored thereon comprising configured to be executed on a computing device, and, when executed, cause the computing device to perform operations comprising:
  receiving a dropped packet notification message sent from a network element containing indicia identifying a packet sent from the computing device and destined for a destination computer was dropped by the network element;
  retransmitting the packet that was dropped toward the destination computer,
  receiving a dropped packet notification message sent from a network element containing indicia identifying a packet sent from a source computer and destined for the computing device was dropped by the network element; and
  in response to receiving the dropped packet message, pre-empting sending a Selective Acknowledgement (SACK) message for the packet to the source computer.

24. The non-transient tangible machine readable medium of claim 23, wherein the instructions comprise a Transaction Control Protocol (TCP) socket.

* * * * *